United States Patent [19]

Angelov et al.

[11] 4,429,820

[45] Feb. 7, 1984

[54] APPARATUS FOR FEEDING WIRE OVER LARGE DISTANCES

[75] Inventors: Angel S. Angelov; Dimiter A. Ivanov, both of Sofia, Bulgaria

[73] Assignee: Institute Po Technicheska Kibernetika, Sofia, Bulgaria

[21] Appl. No.: 373,536

[22] Filed: Apr. 30, 1982

[30] Foreign Application Priority Data

Apr. 30, 1981 [BG] Bulgaria .................................. 51904

[51] Int. Cl.³ ............................................. B65H 51/02
[52] U.S. Cl. ..................................... 226/108; 226/188
[58] Field of Search ................... 226/108, 4, 188, 168, 226/181, 186, 187, 174, 178; 318/3, 4, 5, 8, 34, 53, 55, 66

[56] References Cited

U.S. PATENT DOCUMENTS 4,261,500  4/1981  Samokovliski et al. ............ 226/188
4,305,537 12/1981  Samokovliski et al. ............ 226/108

Primary Examiner—Stanley N. Gilreath

[57] ABSTRACT

Apparatus for feeding wire at great distances, as in feeding electrode wire in electric welding. A plurality of wire-feeding mechanisms are disposed in tandem, each of such mechanisms being coupled to a DC motor, the DC motors being connected in parallel through individual back-polarizing diodes. The first or leading DC motor is connected via a speed stabilizer in a generator for switch-on impulses to a thyristor rectifier, the outputs of a rectifier being connected to the first DC motor. Each of the remaining DC motors is connected to the outputs of the thyristor rectifier, the connection of all DC motors to the thyristor rectifier being effected via a respective separating diode. The apparatus of the invention is particularly characterized by its simplified structure, while it still preserves all functional possibilities of prior art systems for feeding wire over large distances.

3 Claims, 1 Drawing Figure

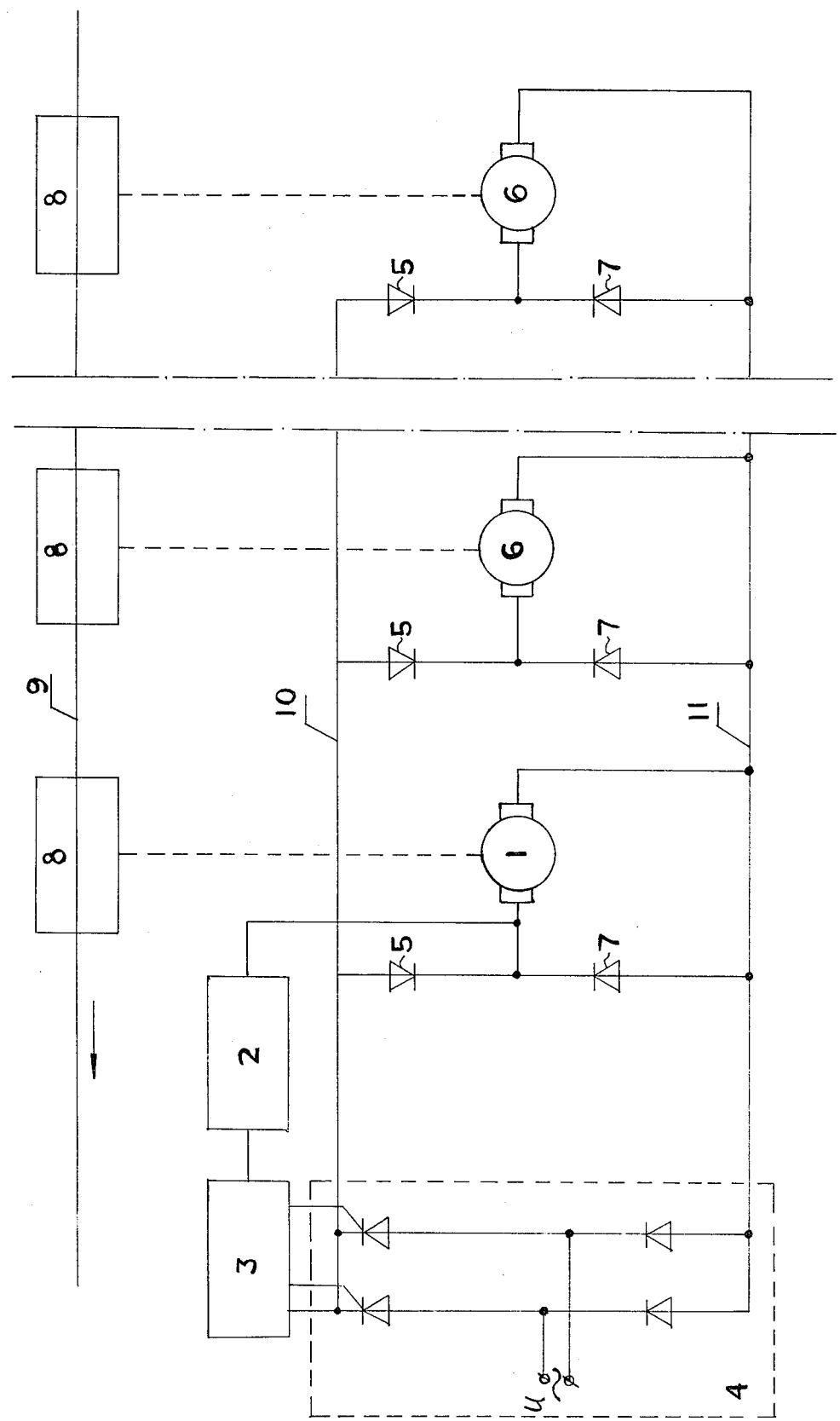

APPARATUS FOR FEEDING WIRE OVER LARGE DISTANCES

This invention relates to an apparatus for feeding wire over large distances, and is particularly adapted for feeding electrode wire in electric welding.

A known apparatus, disclosed in U.S. Pat. No. 4,305,537 for feeding wire at great distances comprises wire-feeding mechanisms disposed in tandem, each of such mechanisms being coupled to a DC motor. In parallel to each motor there is connected one individual back-polarizing diode. The first or leading DC motor is connected via a speed stabilizer and a generator of ignition pulses to a thyristor rectifier, the outputs of the rectifier being connected such DC motor. The remaining DC motors, for the following wire-feeding mechanisms, are each connected individually via a respective thyristor rectifier to a respective genertor for ignition pulses. The output of the generators of switch-on impulses of the first DC motor is connected via common synchronizing conductors or bus bars to the inputs of the generators for switch-on impulses of the remaining DC motors.

The drawback of the afore-described known apparatus lies in the fact that the circuit system is quite complicated.

It therefore the general object of the present invention to provide an apparatus for feeding wire over large distances which has a simplified circuit system.

The above object is achieved by apparatus of the invention for feeding wire over large distances. In the disclosed, preferred embodiment of such apparatus, there are employed tandemly arranged wire-feeding mechanisms, each of which is coupled to its individual DC motor. Each motor has a parallel connected polarizing diode. The first DC motor, for the leading wire-feeding mechanism, is connected via a speed stabilizer and a generator for ignition pulses to a thyristor rectifier, the outputs of such rectifier being connected to the first DC motor. A distinguishing feature of the apparatus of the invention lies in the fact that each of the remaining DC motors, for successive wire-feeding mechanisms, is connected to the outputs of this thyristor rectifier, and the connection of all motors to the thyristor rectifier is effected via a respective separating diode.

The advantage of the invention lies in the simplified structure of the apparatus, while all functional possibilities of the above-described prior art apparatus are preserved.

For a better understanding of the invention, reference should be had to the accompanying drawing, in which:

The single FIGURE is a schematic diagram of an apparatus in accordance with the invention for feeding wire over large distances.

Referring now to the drawing, the apparatus comprises a plurality of tandemly arranged mechanisms (three shown) for feeding a wire 9 in the direction from right to left. the first or leading wire-feeding mechanism is designated $8_a$, whereas the succeeding two such mechanisms are designated $8_b, 8_c$ respectively. The first or leading wire-feeding mechanism $8_a$ is driven by a DC motor 1, whereas each of the succeeding mechanisms $8_b$ and $8_c$ is driven by its individual DC motor 6. The first DC motor 1 is connected by a speed stabilizer 2 and a generator 3 for ignition pulse s to a thyristor rectifier 4 of known design. The rectifier 4 has two outputs which are connected respectively to conductors or bus bars 10 and 11. One terminal of each of motors 1 and 6 is connected to the conductor 10 by its individual separating diode 5 which passes current to the respective motor from the conductor 10 but prevents passage of such current in the reverse direction. The same one terminal of each of motors 1 and 6 is also connected to the conductor 11 through a back-polarizing diode 7 which blocks the flow of current therethrough from said one terminal of motors 1 and 6 to the conductor 11 the second terminals of each of motors 1 and 6 are directly connected to the conductor 11. The thyristor rectifier 4 is supplied with alternating current, as shown at U.

The above-described apparatus operates as follows.

The thyristor rectifier 4 feeds feeding DC current impulses to the motors 1 and 6. In the interval between successive DC current impulses there is formed an electromotive voltage in the motors 1 and 6, such voltage being proportional to the speed of revolution of each of the motors and to a proportionality factor, which can be different for each of the motors because of production tolerances. It is also possible that at any given moment the motors 1 and 6 do not rotate at the same speed. Because of such two possible conditions, it may occur that the electromotive voltages which drive each of the motors 1 and 6 are different. The separating diodes 5 make it possible for these different voltages in each motor to exist simultaneously and independently of each other; only the electromotive voltage of the first motor 1 is fed to the speed stabilizer 2 to give information as to the speed of such motor 1. This would be impossible if the motors 1 and 6 were connected directly parallel without the separating diodes 5. Moreover, an undesired electromechanical interaction would occur, if the separating diodes were not employed, during the pauses between the feeding DC current impulses: The motors with higher electromotove voltage would operate in a generator mode and, hence in a braking condition, while the other motors would operate, respectively, in a driving condition.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. Apparatus for feeding wire over large distances from a source of wire supply to a work station, comprising first and second tandemly arranged wire-feeding mechanisms, the first wire-feeding mechanism being disposed adjacent the work station and the second wire-feeding mechanism being disposed nearer the source of wire supply than the first wire-feeding mechanism, a first D.C. motor drivingly connected to the first wire-feeding mechanism, said first motor having two terminals, a second D.C. motor drivingly connected to the second wire-feeding mechanism, said second motor having two terminals, a source of alternating current connected to a pulse governed thyrister rectifier having a first output terminal connected to a first output conductor and a second output terminal connected to a second output conductor, the first terminal of each of said first and second motors being connected in parallel to the first output conductor through a respective separating diode and to the second output conductor through a back-polarizing diode, the second terminal of each of said first and second motors being directly connected in parallel to the second output conductor, the first terminal of the first motor being connected through a speed stablizer to a pulse generator connected to the thyrister rectifier so as to transmit ignition pulses thereto.

2. Apparatus according to claim 1, wherein the wire is an electrode wire and the work station is an electric welding station.

3. Apparatus according to claim 1, comprising a plurality of tandemly arranged similar second wire-feeding mechanisms, said second wire-feeding mechanisms all being similarly connected to said output conductors.

* * * * *